United States Patent
Nakayama et al.

(10) Patent No.: US 12,176,543 B2
(45) Date of Patent: Dec. 24, 2024

(54) POLYIMIDE-BASED BINDER FOR POWER STORAGE DEVICE, ELECTRODE MIXTURE PASTE, NEGATIVE ELECTRODE ACTIVE MATERIAL LAYER, NEGATIVE ELECTRODE SHEET FOR POWER STORAGE DEVICE, AND POWER STORAGE DEVICE

(71) Applicant: UBE Corporation, Ube (JP)

(72) Inventors: Takeshige Nakayama, Ube (JP); Kazutaka Narita, Yamagata (JP)

(73) Assignee: UBE Corporation, Ube (JP)

( * ) Notice: Subject to any disclaimer, the term of this patent is extended or adjusted under 35 U.S.C. 154(b) by 614 days.

(21) Appl. No.: 17/593,595

(22) PCT Filed: Mar. 27, 2020

(86) PCT No.: PCT/JP2020/013886
§ 371 (c)(1),
(2) Date: Sep. 21, 2021

(87) PCT Pub. No.: WO2020/196805
PCT Pub. Date: Oct. 1, 2020

(65) Prior Publication Data
US 2022/0166025 A1     May 26, 2022

(30) Foreign Application Priority Data

Mar. 27, 2019  (JP) .................. 2019-060045

(51) Int. Cl.
*H01M 4/62*   (2006.01)
*C08G 73/10*  (2006.01)
*H01M 4/02*   (2006.01)

(52) U.S. Cl.
CPC ........ *H01M 4/622* (2013.01); *C08G 73/1032* (2013.01); *C08G 73/1042* (2013.01); *C08G 73/1071* (2013.01); *C08G 73/1082* (2013.01); *H01M 2004/027* (2013.01)

(58) Field of Classification Search
CPC ........... H01M 4/02; H01M 4/62; H01M 4/622
See application file for complete search history.

(56) References Cited

U.S. PATENT DOCUMENTS

| | | | |
|---|---|---|---|
| 2003/0148185 A1 | 8/2003 | Kusumoto et al. | |
| 2003/0235762 A1 | 12/2003 | Fukui et al. | |
| 2005/0244711 A1 | 11/2005 | Fukui et al. | |
| 2011/0305951 A1 | 12/2011 | Hirano et al. | |
| 2012/0168688 A1* | 7/2012 | Nakayama ............ | H01M 4/133 252/511 |
| 2014/0218875 A1 | 8/2014 | Nakayama et al. | |
| 2016/0233513 A1 | 8/2016 | Abe et al. | |
| 2020/0020926 A1 | 1/2020 | Ohsawa et al. | |

FOREIGN PATENT DOCUMENTS

| | | |
|---|---|---|
| CN | 107602855 A | 1/2018 |
| JP | 2003-203637 A | 7/2003 |
| JP | 2004-022433 A | 1/2004 |
| JP | 2004-235057 A | 8/2004 |
| JP | 2004-288520 A | 10/2004 |
| JP | 2011-076900 A | 4/2011 |
| JP | 2012-129068 A | 7/2012 |
| JP | 2013-67769 A | 4/2013 |
| JP | 2013-069681 A | 4/2013 |
| TW | 201315756 | 4/2013 |
| WO | WO 2004/004031 | 1/2004 |
| WO | WO 2011/040308 | 4/2011 |
| WO | WO 2013-035806 A | 3/2013 |
| WO | WO 2018/174299 | 9/2018 |

OTHER PUBLICATIONS

Extended European Search Report issued in European Patent Application No. 20776914.2, dated Mar. 27, 2023.
Office Action dated Dec. 16, 2020 in Taiwanese Patent Application No. 109110695.
Office Action dated Mar. 25, 2022 in Taiwanese Patent Application No. 109110695.
Office Action dated Oct. 12, 2022 in Taiwanese Patent Application No. 109110695.
English translation of the International Preliminary Report on Patentability (IPRP) issued in International Patent Application No. PCT/JP2020/013886, dated Jun. 16, 2020.
Yasuo Takano et al., 2B23, p. 238(2007), The 48th Battery symposium in Japan.
Yoshio Imai, Journal of The Japan Institute of Electronics packaging,2001, vol. 4, No. 7, 640-646.

\* cited by examiner

*Primary Examiner* — Karie O'Neill Apicella

(74) *Attorney, Agent, or Firm* — KNOBBE, MARTENS, OLSON & BEAR LLP

(57) ABSTRACT

A polyimide-based binder for power storage device having a repeated breaking energy retention ratio of 70% or more. The use of the binder enables improvement of a power storage device having a high capacity.

8 Claims, No Drawings

POLYIMIDE-BASED BINDER FOR POWER STORAGE DEVICE, ELECTRODE MIXTURE PASTE, NEGATIVE ELECTRODE ACTIVE MATERIAL LAYER, NEGATIVE ELECTRODE SHEET FOR POWER STORAGE DEVICE, AND POWER STORAGE DEVICE

TECHNICAL FIELD

The present invention relates to a polyimide-based binder for power storage device, an electrode mixture paste, a negative electrode active material layer, a negative electrode sheet for power storage device, and a power storage device.

BACKGROUND ART

A power storage device such as a lithium secondary battery has a high energy density and a high capacity, and is therefore widely used as a drive power source for mobile information terminals. In recent years, application to industrial applications such as mounting on electric/hybrid automobiles, unmanned aerial vehicles, and the like, has been investigated, and further increase in capacity of a power storage device is being promoted. As an example of increasing a capacity, regarding a negative electrode constituting a power storage device, studies to increase the charge/discharge capacity have been conducted by employing silicon or tin or an alloy containing these having a large storing amount per unit volume.

However, it is known that an electrode active material having a large charge/discharge capacity such as silicon, tin, or an alloy containing these causes a very large volume change associated with charge/discharge. Therefore, when these electrode active materials are used to form a negative electrode active material layer using a general-purpose binder such as polyvinylidene fluoride or a rubber-based resin, problems such as disintegration of the negative electrode active material layer or interfacial peeling between a current collector and a negative electrode active material layer occur due to the volume change of the electrode active material, leading to the deterioration of the cycle characteristics of the power storage device.

To solve these problems, as a method for improving the decrease in cycle characteristics due to volume changes during repeated charging/discharging, there has been proposed a method comprising binding silicon-based particles having an average particle size of 1 to 10 microns using polyimide which has excellent mechanical properties, and subjecting heat-pressure treatment to form a negative electrode active material layer (Patent Documents 1 to 5).

It has been pointed out that in the negative electrode using the polyimide as a binder disclosed in these patent documents, cracks occur in the negative electrode active material layer by charging/discharging, and an island-like structure having a space capable of absorbing volume expansion during charging/discharging is formed, which leads to the improvement in the capacity retention ratio in repeated charging/discharging (Non-Patent Document 1).

CITATION LIST

Patent Document

Patent Document 1: WO2004/004031
Patent Document 2: Japanese Patent Laid-Open Publication No. 2004-235057
Patent Document 3: Japanese Patent Laid-Open Publication No. 2003-203637
Patent Document 4: Japanese Patent Laid-Open Publication No. 2004-288520
Patent Document 5: Japanese Patent Laid-Open Publication No. 2004-022433

Non-Patent Document

Non-Patent Document 1: Proceedings of the 48th Battery Symposium in Japan, 2B23, p. 238 (2007) (Yasuo Takano, et al.)

SUMMARY OF THE INVENTION

Technical Problem

Although improvement in capacity and cycle characteristics may be found to some extent in the conventionally disclosed power storage devices provided with a negative electrode using polyimide as a binder, such high capacity and high cycle characteristics have not been realized that can withstand the practical use required for industrial applications such as electric/hybrid automobiles and unmanned airplanes.

In addition, since all-solid-state batteries do not have a liquid layer that acts as a buffer, the previously disclosed polyimides are not satisfactory to exhibit the functions such as mechanical characteristics and battery characteristics sufficiently that are required for the all-solid-state batteries.

Therefore, an object of the present invention is to solve the above-mentioned problems and to provide a polyimide-based binder for power storage device capable of further improving battery capacity and cycle characteristics. Another object of the present invention is to provide a polyimide-based binder for power storage device capable of exhibiting large capacity, cycle characteristics, and mechanical characteristics even in an all-solid-state battery.

Solution to Problem

As a result of diligent investigations by the present inventors, the present inventors have found that the cycle characteristics and mechanical characteristics of the power storage device having a large capacity are related to the breaking energy of the binder used for the electrode. Therefore, the present invention particularly relates to the following items.

[1] A polyimide-based binder for power storage device having a repeated breaking energy retention ratio of 70% or more.

[2] The polyimide-based binder for power storage device according to the above item 1, wherein a melting point of the binder is higher than 300° C. or does not exist essentially.

[3] The polyimide-based binder for power storage device according to the above item 1 or 2, which is obtained by imidizing a polyamic acid solution comprising a repeating unit represented by the following general formula (I);

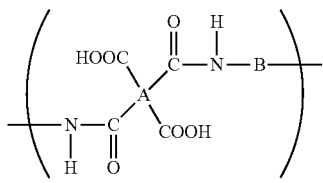

(wherein, A is one or more tetravalent groups selected from groups having aromatic ring(s), open-chain aliphatic groups or groups having an alicyclic structure, which may be substituted with halogen and may be the same or two or more kinds; and B is one or more divalent groups selected from groups having aromatic ring(s), open-chain aliphatic groups or groups having an alicyclic structure, which may be substituted with halogen, and may be the same or two or more kinds.)

[4] The polyimide-based binder for power storage device according to the above item 3, wherein in the general formula (I), 50 mol % or more of one of the groups A and B is an open-chain aliphatic group.

[5] The polyimide-based binder for power storage device according to the above item 3 or 4, wherein in the general formula (I), 50 mol % or more of A is a group represented by the following general formula (II):

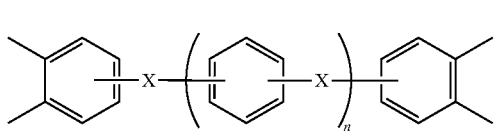

(wherein, X is a single bond or an oxygen atom, n is an integer from 0 to 2, and if n is 1 or 2, X may be the same or different.)

[6] A resin composition for binder, comprising a polyamic acid having a repeating unit represented by the following general formula (I) and a solvent, and capable to form the polyimide-based binder for power storage device according to any one of the above items 1 to 5 by an imidization reaction;

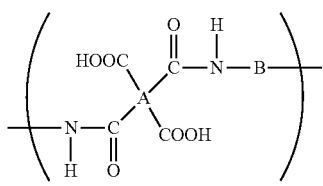

(wherein, A is one or more tetravalent groups selected from groups having aromatic ring(s), open-chain aliphatic groups or groups having an alicyclic structure, which may be substituted with halogen and may be the same or two or more kinds; and B is one or more divalent groups selected from groups having aromatic ring(s), open-chain aliphatic groups or groups having an alicyclic structure, which may be substituted with halogen, and may be the same or two or more kinds.)

[7] An electrode mixture paste containing the resin composition for binder according to the above item 6 and an electrode active material.

[8] A negative electrode active material layer comprising the binder for power storage device according to any one of the above items 1 to 5 and an electrode active material.

[9] A negative electrode sheet for power storage device, comprising the negative electrode active material layer according to the above item 8 formed on a surface of a current collector.

[10] A power storage device comprising the negative electrode sheet for power storage device according to the above item 9.

Advantageous Effect of Invention

According to the present invention, provided is a polyimide-based binder having a repeated breaking energy retention ratio of 70% or more, which is useful for improving the characteristics of a power storage device. Since such a polyimide-based binder exhibits suitable physical behavior for power storage device, it can be used as a binder for various members of the power storage device such as a negative electrode active material layer and a negative electrode sheet.

DESCRIPTION OF EMBODIMENTS

<Polyimide-Based Binder>

The polyimide-based binder of the present invention is characterized by having a repeated breaking energy retention ratio of 70% or more.

The repeated breaking energy retention ratio referred to in the present invention means a numerical value represented by the following equation.

Repeated breaking energy retention ratio= $(TEB_{200-10})/(TEB_0)$ wherein, $(TEB_0)$ is an initial value of tensile breaking energy calculated from a result of a tensile breaking test carried out in accordance with ASTM D882. $(TEB_{200-10})$ is a tensile breaking energy calculated from a result of a tensile breaking test performed after repeating 10% strain 200 times. It may be also simply referred to as 10% repeated breaking energy retention ratio. Similarly, the retention ratio after repeating 20% strain 200 times is referred to as 20% repeated breaking energy retention ratio, and may be referred to as $(TEB_{200-20})$. The retention ratio after repeating 30% strain 200 times is referred to as 30% repeated breaking energy retention ratio and may be referred to as $(TEB_{200-30})$.

Since the polyimide-based binder of the present invention has a repeated breaking energy retention ratio of 70% or more, it is possible to improve the function as a power storage device while maintaining mechanical properties. In particular, the repeated breaking energy retention ratio is preferably 75% or more, 80% or more, 85% or more, and 90% or more. In other words, the higher retention ratio of repeated breaking energy enables the higher level of functions such as excellent cycle characteristics without impairing the mechanical properties even when a negative electrode active material with a large volume change ratio is used in a large amount. Depending on the application of the power storage device, 20% repeated breaking energy retention ratio of 60% or more, more preferably 70% or more and particularly 80% or more, may be used as an additional index for evaluation. Depending on the application of yet another power storage device, 30% repeated breaking energy retention ratio of 50% or more, preferably 60% or more and more preferably 70% or more, may be used as an additional index for evaluation In this way, using a repeated breaking energy retention ratio, and by appropriately determining the numerical values of the elements of the test conditions and the criteria thereof, for example, the strain value (for example, "10%" strain or "20%" strain), the breaking energy value, the number of repetitions, and the retention ratio, according to the purpose, and using them as one of the indexes of evaluation, it is possible to develop a polyimide-based binder that matches the required characteristics of the power storage device From another point of view, it is preferable that the polyimide-based binder of the present invention has a melting point higher than 300° C., or the melting point does not exist essentially. In particular, it is more preferable that the melting point exceeds 330° C., or the melting point does not exist essentially. Since the polyimide-based binder has such characteristics, it can be suitably used even in industrial applications that may be used in a high temperature environment.

The polyimide-based binder of the present invention refers to a polymer compound in which a repeating unit containing an imide bond is 50 mol % or more in the total repeating units. Examples of the polymer capable of forming such a polyimide-based binder include polymer compounds having a group capable of forming an imide bond in a main chain by heating or chemical reaction, and preferred compounds include, for example, a polyamic acid, in particular, a polyamic acid having the following formula (I) in an amount preferably 50 mol % or more, more preferably 70 mol % or more, and even more preferably 90 mol % or more.

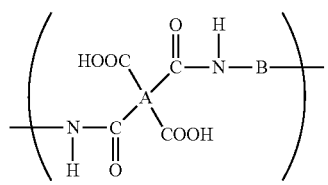

(wherein, A is one or more tetravalent groups selected from groups having aromatic ring(s), open-chain aliphatic groups or groups having an alicyclic structure, which may be substituted with halogen and may be the same or two or more kinds; and B is one or more divalent groups selected from groups having aromatic ring(s), open-chain aliphatic groups or groups having an alicyclic structure, which may be substituted with halogen, and may be the same or two or more kinds.)

As the chemical structure of the polyimide-based binder, for example, a polyimide-based binder comprising a repeating unit represented by the following general formula (III) in an amount 50% or more, preferably 70% or more, more preferably 90% or more of is preferable.

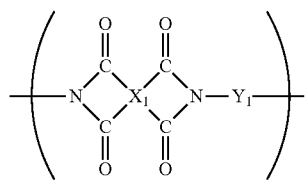

(wherein, $X_1$ is one or more tetravalent groups selected from groups having aromatic ring(s), open-chain aliphatic groups or groups having an alicyclic structure, which may be substituted with halogen and may be the same or two or more kinds; and Yi is one or more divalent groups selected from groups having aromatic ring(s), open-chain aliphatic groups or groups having an alicyclic structure, which may be substituted with halogen, and may be the same or two or more kinds.)

The above-mentioned polyimide-based binder may be prepared by a known method using a tetracarboxylic acid component having an A structure in the formula (I) or an $X_1$ structure in the formula (III) and a diamine component having a B structure in the formula (I) or a Yi structure in the formula (III) as essential components, and if necessary, other components.

The tetracarboxylic acid component is not particularly limited, but preferred examples thereof include:

aromatic tetracarboxylic dianhydrides such as 3,3',4,4'-biphenyltetracarboxylic dianhydride, 2,3,3',4'-biphenyltetracarboxylic dianhydride, 2,2',3,3'-biphenyltetracarboxylic dianhydride, pyromellitic dianhydride, benzophenonetetracarboxylic dianhydride, 4,4'-oxydiphthalic dianhydride, diphenylsulfonetetracarboxylic dianhydride, p-terphenyltetracarboxylic dianhydride, m-terphenyltetracarboxylic dianhydride;

alicyclic tetracarboxylic dianhydrides such as cyclobutane-1,2,3,4-tetracarboxylic dianhydride, 1,2,4,5-cyclohexanetetracarboxylic dianhydride, dicyclohexyl-3,3',4,4'-tetracarboxylic dianhydride, 1,2,4,5-cyclohexanetetracarboxylic-1,2:4,5-dianhydride, bicyclo[2.2.2] octo-7-en-2,3: 5,6-tetracarboxylic dianhydride;

halogen-substituted tetracarboxylic dianhydrides such as 4,4'-(hexafluoroisopropylidene)diphthalic anhydride, 3,3'-(hexafluoroisopropyridene) diphthalate anhydride, 5,5'-[2,2,2-trifluoro-1-[3-(trifluoromethyl)phenyl]ethylidene]diphthalic anhydride, 5,5'-[2,2,3,3,3-pentafluoro-1-(trifluoromethyl)propyridene]diphthalic anhydride, 1H-difluoro[3,4-b: 3',4'-i]xanthene-1,3,7,9(11H)-tetron, 5,5'-oxybis[4,6,7-trifluoro-pyromellitic anhydride], 3,6-bis (trifluoromethyl)pyromellitic dianhydride, 4-(trifluoromethyl)pyromellitic dianhydride, 1,4-difluoropyromellitic dianhydride, 1,4-bis (3,4-dicarboxytrifluorophenoxy)tetrafluorobenzene dianhydride; and the like. These may be used alone or in combination of two or more.

Depending on the application of the power storage device, it is preferable to use a polyimide-based binder in which A or $X_1$ in the formula (I) or the formula (III) comprises the groups represented by the following formula (II) in an amount of 50 mol % or more.

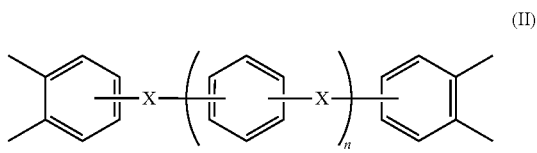

(wherein, X is a single bond or an oxygen atom, n is an integer from 0 to 2, and if n is 1 or 2, X may be the same or different.)

The diamine component is not particularly limited, but preferred examples thereof include:

aromatic diamines such as p-phenylenediamine, m-phenylenediamine, 4,4'-diaminodiphenyl ether, 4,4'-diaminodiphenylmethane, 2,4-toluenediamine, 3,3'-dihydroxy-4,4'-diaminobiphenyl, bis (4-amino-3-carboxyphenyl)methane, 2,4-diaminotoluene;

halogen-substituted diamines such as 2,2'-bis(trifluoromethyl)-4,4'-diaminobiphenyl, 2,3,5,6-tetrafluoro-1,4-diaminobenzene, 2,4,5,6-tetrafluoro-1,3-diaminobenzene, 2,3,5,6-tetrafluoro-1,4-benzene(dimethaneamine), 2,2'-difluoro (1,1'-biphenyl)-4,4'-diamine, 4,4'-diaminooctafluorobiphenyl, 2,2-bis (4-amino) phenyl) hexafluoropropane, 4,4'-oxybis(2,3,5,6-tetrafluoroaniline);

alicyclic diamines optionally substituted with halogen such as trans-1,4-diaminocyclohexane, cis-1,4-diaminocyclohexane, 1,3-bis(aminomethyl)cyclohexane, 1,4-bis(aminomethyl)cyclohexane;

straight open-chain aliphatic diamines such as 1,4-tetramethylenediamine, 1,5-pentamethylenediamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine; and open-chain aliphatic diamines having branched structure in which the above straight open-chain aliphatic diamines are substituted with alkyl groups.

These diamines may be used alone or in combination of two or more. In one embodiment of the present invention, the diamine component preferably comprises an open-chain aliphatic diamine having straight chain or branched structure, in an amount of preferably 40 mol % or more, more preferably 50 mol % or more, still more preferably 60 mol % or more, still more preferably 70 mol % or more, and may be 100 mol %. The number of carbon atoms of the open-chain aliphatic diamine is preferably 2 or more, more preferably 6 or more, still more preferably 8 or more, for example, 22 or less, preferably 18 or less. The open-chain aliphatic diamine is preferably straight chain structure, but in the case of a branched chain structure, the carbon number of the straight chain portion (that is, the number of carbons for bonding two amino groups) is preferably as described above.

Further, a known dicarboxylic acid component may be added at a ratio of less than 50 mol % with respect to 1 mol of the tetracarboxylic acid so that an ester bond can be formed. Or, various repeating units may be introduced using diamines having a polyether structure, diamines having a polysiloxane structure. diamines having a carbonate structure, or the like. Such a structure may be appropriately determined according to the application, function, and the like of the power storage device.

<Resin Composition for Binder>

A resin composition for a binder, which is one of the embodiments of the present invention, comprises at least a polyamic acid capable of forming a polyimide-based binder and a solvent, and can form the above-mentioned polyimide-based binder. The polyamic acid is dissolved in a solvent, and the solid content concentration (polyimide-converted concentration) is preferably in the range of 5 to 45% by mass. Examples of the polyamic acid include polyamic acids comprising the repeating unit represented by the above formula (I) in an amount of preferably 50 mol % or more, preferably 70 mol % or more, and more preferably 90 mol % or more. The resin composition for a binder can be prepared by reacting a tetracarboxylic acid component having an A structure in the formula (I) and a diamine component having a B structure in the formula (I) as essential components, and if necessary, with other components in a solvent. Specific examples of the tetracarboxylic acid component and the diamine component are as described above in the section <Polyimide-based binder>. The reaction solution may be used as it is as a resin composition for a binder, or may be concentrated or diluted if necessary.

Preferred solvents include nonpolar solvents, for example, aromatic hydrocarbons such as xylene, toluene and ethylbenzene, aliphatic hydrocarbons such as pentane, hexane and heptane, and benzoic acid esters such as methyl benzoate, ethyl benzoate and propyl benzoate; and water, methanol, ethanol, acetone, N, N-dimethylformamide, dimethylamide, N, N-dimethylacetamide, N, N-diethylformamide, N-methyl-2-pyrrolidone, N-ethyl-2-pyrrolidone, 1,3-dimethyl-2-imidazolidinone, N-methylcaprolactam, hexamethylphosphortriamide, 1,2-dimethoxymethane, bis (2-methoxyethyl) ether, 1,2-bis(2-methoxyethoxy)ethane, tetrahydrofuran, bis[2-(2-methoxyethoxy)ethyl] ether, 1,4-dioxane, dimethylsulfoxide, dimethylsulfone, diphenyl ether, sulfolane, diphenylsulfone, tetramethylurea, anisole, m-cresol, phenol, γ-butyllactone; and in particular, water, N-methyl-2-pyrrolidone, N-ethyl-2-pyrrolidone, and γ-butylollactone are preferable.

To the resin composition for the binder, additive(s) other than the electrode active material, which will be described in the next section <Electrode mixture paste>, may be added in advance.

<Electrode Mixture Paste>

The electrode mixture paste, which is one of the embodiments of the present invention, is a composition comprising a polyamic acid, an electrode active material, and a solvent. As the polyamic acid, a polyamic acid capable of forming the polyimide-based binder of the present invention can be used.

As the electrode active material that can be used in the electrode mixture paste of the present invention, known materials can be preferably used. The polyimide-based binder of the present invention can be used in either a negative electrode or a positive electrode. Therefore, the electrode active material may be either a negative electrode active material or a positive electrode active material. Generally, the negative electrode is more effective in using the polyimide-based binder of the present invention. In this case, the electrode active material includes a negative electrode active material. As the electrode active material, for example, a lithium-containing metal composite oxide, a carbon powder, a silicon powder, a tin powder, or an alloy powder containing silicon or tin is preferable. The amount of the electrode active material in the electrode mixture paste is not particularly limited, but is usually 0.1 to 1000 times, preferably 1 to 1000 times, more preferably 5 to 1000 times, further more preferably 10 to 1000 times, based on the mass of the binder resin composition for electrodes. If the amount of the electrode active material is too large, the electrode active material is not sufficiently bound to the current collector and easily falls off. On the other hand, if the amount of the electrode active material is too small, the negative electrode active material layer formed on the current collector has many inactive portions, and the function as an electrode may be insufficient. It may be appropriately determined according to the desired capacity.

As a negative electrode active material for power storage device, for example, a lithium secondary battery, a lithium metal, a lithium alloy, and a carbon material capable of absorbing and releasing lithium [easily graphitizable carbon, hardly graphitizable carbon having (002) plane spacing of 0.37 nm or more, graphite having (002) surface spacing of 0.34 nm or less, or the like], tin (elemental substance), tin compound, silicon (elemental substance), silicon compound, or lithium titanate compounds such as $Li_4Ti_5O_{12}$ or the like can be used alone or in combination of two or more types. In the present invention, it is preferable that the negative electrode active material comprises at least tin (elemental substance), tin compound, a silicon-containing electrode active material such as silicon (elemental substance) or silicon compound. In particular, the silicon-containing negative electrode active material such as silicon (elemental substance) or a silicon compound has an extremely large theoretical capacity as compared with graphite, while the volume expansion ratio of the electrode active material itself during charging is also extremely large.

If the polyimide-based binder for power storage device of the present invention is used, deterioration of the electrode active material due to volume expansion can be remarkably suppressed, so that the characteristics of the power storage device in a wide temperature range can be remarkably improved, in terms of not only the characteristics during use such as cycle characteristics but also the low temperature characteristics after high temperature storage and gas generation and the like.

The type of the silicon-containing negative electrode active material is not particularly limited, and examples thereof include silicon (elemental substance), a silicon compound, a partial substitution product of silicon, a partial substitution product of a silicon compound, and a solid solution of a silicon compound. Specific suitable examples of the silicon compound include silicon oxides represented by formula: $SiO_x$ (0.05<x<1.95), silicon carbides represented by formula: $SiC_y$ (0<y<1), silicon nitrides represented by formula: $SiNz$ (0<z<4/3), silicon alloys which are alloys of silicon and other different element(s) M, and the like. In the case of silicon alloys, preferred examples of other different element M1 include at least one element selected from the group consisting of Fe, Co, Sb, Bi, Pb, Ni, Cu, Zn, Ge, In, Sn and Ti.

The partial substitution product of silicon is a compound in which a part of silicon contained in silicon (elemental substance) and a silicon compound is replaced with other different element M2. Specific preferred examples of the other different element M2 include B, Mg, Ni, Ti, Mo, Co, Ca, Cr, Cu, Fe, Mn, Nb, Ta, V, W, Zn, C, N and Sn. Among these silicon-containing active materials, more preferred are silicon (elemental substance), silicon oxide, and silicon alloy, and further more preferred are silicon (elemental substance) and silicon oxide.

The amount of the silicon-containing negative electrode active material is, as a mass of the net silicon in the negative electrode mixture, preferably 1% by mass or more, more preferably 5% by mass or more, still more preferably 10% by mass or more to obtain higher capacity, and preferably 95% by mass or less, more preferably 65% by mass or less, and further more preferably 45% by mass or less from the viewpoint of improving cycle characteristics.

Further, examples of the electrode active material for a lithium primary battery, particularly the negative electrode active material, include lithium metal and lithium alloy.

Preferred solvents that can be used in the electrode mixture paste of the present invention include nonpolar solvents, for example, aromatic hydrocarbons such as xylene, toluene and ethylbenzene, aliphatic hydrocarbons such as pentane, hexane and heptane, and benzoic acid esters such as methyl benzoate, ethyl benzoate and propyl benzoate; and water, methanol, ethanol, acetone, N, N-dimethylformamide, dimethylamide, N, N-dimethylacetamide, N, N-diethylformamide, N-methyl-2-pyrrolidone, N-ethyl-2-pyrrolidone, 1,3-dimethyl-2-imidazolidinone, N-methylcaprolactam, hexamethylphosphortriamide, 1,2-dimethoxymethane, bis(2-methoxyethyl) ether, 1,2-bis(2-methoxyethoxy)ethane, tetrahydrofuran, bis[2-(2-methoxyethoxy)ethyl] ether, 1,4-dioxane, dimethylsulfoxide, dimethylsulfone, diphenyl ether, sulfolane, diphenylsulfone, tetramethylurea, anisole, m-cresol, phenol, γ-butyllactone; and in particular, water, N-methyl-2-pyrrolidone, N-ethyl-2-pyrrolidone, and γ-butylollactone are preferable.

As the solvent, the solvent in the resin composition for a binder may be used as it is, or if necessary, it may be concentrated or an additional solvent may be added to provide an appropriate concentration for coating.

In the electrode mixture paste of the present invention, when it is made into an aqueous solvent system, it is preferable to contain a pyridine compound or an imidazole compound. As a result, the degree of swelling of the obtained polyimide with respect to the electrolytic solution can be made smaller, and the elongation at break and breaking energy can be made larger. In addition, the heat treatment temperature for obtaining the negative electrode active material layer can be lowered. Pyridine compounds are compounds having a pyridine moiety in their chemical structure, and preferred examples thereof include pyridine, 3-pyridinol, quinoline, isoquinoline, quinoxaline, 6-tert-butylquinoline, acridine, 6-quinoline carboxylic acid, 3,4-lutidine, pyridazine, and the like. These pyridine compounds may be used alone or in combination of two or more. Examples of the imidazole compound include 1,2-dimethylimidazole, 2-ethyl-4-methylimidazole, 4-ethyl-2-methylimidazole, 1-methyl-4-ethylimidazole and the like. The imidazoles may be used alone of or in a mixture of plural kinds.

The amount of the pyridine compound to be added is not limited, but it is preferably 0.05 to 2.0 molar equivalents, more preferably 0.1 to 1.0 molar equivalent, with respect to 1 mol of amic acid repeating unit of the polyamic acid. If the added amount is outside of this range, it may be difficult to use an aqueous solvent system. The amount of the imidazole compound to be added is not limited, but it is 1.6 molar equivalents or more, more preferably 2.0 molar equivalents or more, still more preferably 2.4 molar equivalents or more, with respect to 1 mol of amic acid repeating unit of the polyamic acid.

To the electrode mixture paste of the present invention, known additives may be added if necessary. For example, negative electrode conductive agent, base, surfactant, viscosity modifier, conductive assisting agent, silane coupling agent, binder other than a polyimide-based binder, and the like may be used as long as the effects of the present invention are not impaired.

The negative electrode conductive agent is not particularly limited as long as it is an electron conductive material that does not cause a chemical change, but it is preferable to use metal powders such as copper, nickel, titanium, or aluminum, carbon materials, or the like. Carbon materials used as conductive agents and negative electrode active materials preferably include graphites such as natural graphite (scaly graphite and the like), artificial graphite and other graphite; one or more of carbon blacks selected from acetylene black, ketjen black, channel black, furnace black, lamp black, and thermal black; and fibrous carbon powders such as carbon nanotubes and carbon fibers Further, it is more preferable that the negative electrode conductive agents may be appropriately mixed and used in such a mixture as graphite and carbon black, graphite and fibrous carbon powder, or carbon black and fibrous carbon powder. In particular, the use of fibrous carbon powder is preferable because it has an effect of reducing the use of a conductive agent having a large specific surface area in order to ensure conductivity. The carbon material is used as a conductive agent or a negative electrode active material, and the amount of the carbon material added to the negative electrode mixture is preferably 1 to 90% by mass, more preferably 10 to 70% by mass.

When a carbon material is used as a negative electrode conductive agent by mixing it with a silicon-containing negative electrode active material, the ratio of the silicon-containing negative electrode active material and the carbon material is such that the carbon material is preferably 10% by mass or more, more preferably 20% by mass or more, based on the total net mass of silicon in the silicon-containing negative electrode active material in the negative electrode mixture, from the viewpoint of improving a cycle characteristic due to the effect of enhancing electron conductivity by mixing with the carbon material. Further, if the ratio of the carbon material mixed with the silicon-containing negative electrode active material is too large, the amount of the silicon-containing negative electrode active material in the negative electrode mixture layer may decrease, and the effect of increasing the capacity may be reduced. The net mass of silicon in the silicon-containing negative electrode active material is preferably 1% by mass or more, more preferably 2% by mass or more, and further more preferably 5% by mass or more, based on the total mass of the carbon material. Further, it is more preferable that the conductive agent is composited by mixing it with a silicon-containing active material in advance and appropriately heat-treated if needed.

When graphite is used, more preferably used is a carbon material having a graphite-type crystal structure in which the plane spacing (d002) of the graphite lattice planes (002) is 0.340 nm (nanometers) or less, particularly 0.335 to 0.337 nm. In particular, preferred one is an artificial graphite particles having a massive structure in which a plurality of flat graphite fine particles are assembled or bonded in a non-parallel manner to each other, or spheroidized particles of scaly natural graphite obtained by applying repeatedly mechanical actions such as compressive force, frictional force, and shearing force.

The ratio I (110)/I (004) is preferably 0.01 or more because the electrochemical characteristics in a wider temperature range are improved, and is more preferably 0.05 or more, and further more preferably 0.1 or more, wherein I (110)/I (004) is a ratio of peak intensity I (110) of (110) plane and peak intensity I (004) of (004) plane of the graphite crystal determined from X-ray diffraction measurement measured for the negative electrode sheet obtained by press-forming the negative electrode into a density of 1.5 g/cm$^3$ or more excluding the current collector. In addition, the upper limit of the peak intensity ratio I (110)/I (004) is preferably 0.5 or less and more preferably 0.3 or less, because excessive treatment may reduce the crystallinity and the discharge capacity of the battery.

Further, it is preferable that the highly crystalline carbon material (core material) is coated with a carbon material having a lower crystallinity than the core material because the electrochemical characteristics in a wide temperature range are further improved. The crystallinity of the coated carbon material can be confirmed by TEM. When a highly crystalline carbon material is used, it reacts with a non-aqueous electrolyte solution during charging and tends to deteriorate the characteristics of the power storage device in a wide temperature range such as low temperature characteristics after high temperature storage and gas generation due to the increase in interfacial resistance. However, if the polyimide-based binder for power storage device according to the present invention is used, the characteristics of these power storage devices are improved.

As the negative electrode binder, the polyimide-based binder for power storage device of the present invention is used. When the polyimide-based binder for power storage device of the present invention is used in combination with other binders, the ratio of the mass of the other binder to the total mass of the binder is preferably 1 to 95% by mass, more preferably 5 to 45% by mass.

Examples of binders other than the polyimide-based binder for power storage device of the present invention include polyvinylidene fluoride, polytetrafluoroethylene, styrene butadiene rubber, butadiene rubber, nitrile rubber, polyacrylonitrile, ethylene vinyl alcohol copolymer resin, ethylene propylene diene rubber, polyurethane, polyacrylic acid, polyamide, polyacrylate, polyvinyl ether, fluororubber, carboxymethyl cellulose, and sodium carboxymethyl cellulose.

In addition, the electrode mixture paste of the present invention may further contain a solid electrolyte. Examples of the solid electrolyte include oxide-based solid electrolytes such as $La_{0.51}Li_{0.34}TiO_{2.94}$ having perovskite type crystal, $Li_7La_3Zr_2O_{12}$ having garnet type crystal, $Li_{1.3}Al_{0.3}Ti_{1.7}(PO_4)_3$ having NASICON type crystal, and amorphous LIPON ($Li_{2.9}PO_{3.3}N_{0.46}$); and sulfide-based solid electrolytes such as $Li_2S$—$SiS_2$ based materials and $Li_2S$—$P_2S_5$ based materials.

The electrode mixture paste of the present invention can be produced as a uniform composition by applying the above-mentioned components to a known production method and by adding, stirring, mixing and the like. For example, an electrode mixture paste may be produced by producing a solution or dispersion in which a polyimide-based binder and a solvent are mixed, and then adding and mixing various additives.

<Negative Electrode Active Material Layer>

The negative electrode active material layer, which is one of the embodiments of the present invention, can be produced by film-forming an electrode mixture paste by a known method. Although not particularly limited, one example thereof comprises preparing an electrode mixture paste comprising a polyimide-based binder, a solvent and a negative electrode active material, casting or applying the electrode mixture paste on a metal foil or a plastic film, heat-treating it to remove the solvent and, if necessary, perform imidization reaction to obtain the layer. In particular, a negative electrode sheet for power storage device can be manufactured by forming a negative electrode active material layer on a conductive current collector formed of a metal foil such as an aluminum foil.

The thickness of the negative electrode active material layer of the present invention may be appropriately determined according to the application of the power storage device and the desired capacity. Although not limited, it is preferably used in the range of 0.1 μm to 500 μm, for example. In particular, 1 μm or more, 10 μm or more, and 20 μm or more is more preferable, and 300 μm or less, 100 μm or less, and 50 μm or less is more preferable.

<Negative Electrode Sheet for Power Storage Device>

The negative electrode sheet for power storage device, which is one of the embodiments of the present invention, is a sheet formed by casting or applying the electrode mixture paste, which is a mixture of a polyimide-based binder for power storage device of the present invention, a negative electrode active material and an optional component such as a conductive agent and the like, on a current collector to form an active material layer. Preferably, the negative electrode sheet for power storage device of the present invention is a negative electrode sheet formed by casting or applying the electrode mixture paste which comprises a polyimide-based binder for power storage device of the present invention, a silicon-containing negative electrode active material and a carbon material, on a current collector to form an active material layer.

<Positive Electrode Active Material>

As a positive electrode active material for power storage device, especially for lithium secondary batteries, a composite metal oxide with lithium containing at least one selected from cobalt, manganese and nickel is used.

These positive electrode active materials can be used alone or in combination of two or more. Examples of such lithium composite metal oxides include one or more selected from $LiCoO_2$, $LiMn_2O_4$, $LiNiO_2$, $LiCo_{1-x}Ni_xO_2$ ($0.01<x<1$), $LiCo_{1/3}Ni_{1/3}Mn_{1/3}O_2$, $LiNi_{1/2}Mn_{3/2}O_4$, and $LiCo_{0.98}Mg_{0.02}O_2$. Further, these may be used in combination, for example, $LiCoO_2$ and $LiMn_2O_4$, $LiCoO_2$ and $LiNiO_2$, and $LiMn_2O_4$ and $LiNiO_2$.

In addition, a part of the lithium composite metal oxide may be replaced with another element in order to improve safety and cycle characteristics during overcharging or to enable the use at a charging potential of 4.3 V or higher. For example, a part of cobalt, manganese, and nickel may be replaced with at least one or more elements such as Sn, Mg, Fe, Ti, Al, Zr, Cr, V, Ga, Zn, Cu, Bi, Mo, and La. Or a part of O can be replaced with S or F, or a coating may be formed by a compound containing these other elements.

Among these, preferred are lithium composite metal oxides that are operable at a charging potential of the positive electrode of 4.3 V versus Li or higher in a fully charged state, such as $LiCoO_2$, $LiMn_2O_4$, and $LiNiO_2$. More preferred are lithium composite metal oxides that are operable at 4.4 V or higher, for example, different-element-substituted lithium cobalt oxides such as $LiCo_{1-x}M_xO_2$ (wherein, M is one or more elements selected from Sn, Mg, Fe, Ti, Al, Zr, Cr, V, Ga, Zn, and Cu, $0.001 \leq x \leq 0.05$), and lithium composite metal oxides in which the ratio of nickel atoms and manganese atoms to all metal elements other than lithium atoms is 50 atomic % or more and 100 atomic % or less such as $LiNi_{1/3}Mn_{1/3}Co_{1/3}O_2$, $LiNi_{0.5}Mn_{0.3}Co_{0.2}O_2$, $LiNi_{1/2}Mn_{3/2}O_4$, and a solid solution of $Li_2MnO_3$ and $LiMO_2$ (wherein, M is a transition metal such as Co, Ni, Mn, Fe and the like). When a lithium composite metal oxide that operates at a high charging voltage is used, the characteristics of the power storage device tend to deteriorate when used in a wide temperature range due to the reaction with the electrolytic solution during charging. However, if the polyimide binder for the power storage device according to the present invention is used, deterioration of the characteristics of these a power storage device can be suppressed.

Further, as the positive electrode active material, lithium-containing olivine-type phosphate salts can also be used. In particular, a lithium-containing olivine-type phosphate containing at least one selected from iron, cobalt, nickel and manganese is preferable. Specific preferred examples thereof include one or more selected from $LiFePO_4$, $LiCoPO_4$, $LiNiPO_4$, and $LiMnPO_4$.

Some of these lithium-containing olivine phosphates may be replaced with other elements, and a part of iron, cobalt, nickel and manganese may be replaced with one or more elements selected from Co, Mn, Ni, Mg, Al, B, Ti, V, Nb, Cu, Zn, Mo, Ca, Sr, W, Zr and the like, or a coating may be formed by a compound containing these other elements or carbon material. Among these, $LiFePO_4$ or $LiMnPO_4$ is preferred. Further, the lithium-containing olivine-type phosphate can be used in a mixture with, for example, the above-mentioned positive electrode active material(s).

Further, examples of the positive electrode for the lithium primary battery include oxides or chalcogen compounds of one or more metal elements such as CuO, $Cu_2O$, $Ag_2O$, $Ag_2CrO_4$, CuS, $CuSO_4$, $TiO_2$, $TiS_2$, $SiO_2$, SnO, $V_2O_5$, $V_6O_{12}$, $VO_x$, $Nb_2O_5$, $Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, FeO, $Fe_3O_4$, $Ni_2O_3$, NiO, $CoO_3$, CoO and the like, sulfur compounds such as $SO_2$, $SOCl_2$, fluorinated carbons (fluorinated graphites) represented by general formula $(CF_x)_n$ and the like. Among these, $MnO_2$, $V_2O_5$, fluorinated graphites and the like are preferable.

<Positive Electrode Conductive Agent>

The positive electrode conductive agent is not particularly limited as long as it is an electronic conductive material that does not cause a chemical change. Preferred examples thereof include graphites such as natural graphite (scaly graphite and the like), artificial graphite and other graphite; one or more of carbon blacks selected from acetylene black, ketjen black, channel black, furnace black, lamp black, and thermal black; and fibrous carbon powders such as carbon nanotubes and carbon fibers. Further, it is more preferable that the positive electrode conductive agents may be appropriately mixed and used in such a mixture as graphite and carbon black, graphite and fibrous carbon powder, or carbon black and fibrous carbon powder. The amount of the carbon material added to the positive electrode mixture is preferably 1 to 10% by mass, more preferably 2 to 5% by mass <Positive Binder>

As the positive electrode binder, the polyimide-based binder for power storage device of the present invention can be used, but other binders may be also used, and the examples thereof include polytetrafluoroethylene (PTFE), polyvinylidene fluoride (PVDF), copolymer of styrene and butadiene (SBR), copolymers of acrylonitrile and butadiene (NBR), carboxymethyl cellulose (CMC), or ethylene propylene dienter terpolymer.

Further, the polyimide-based binder for power storage device of the present invention and other binders can be used in combination, but the preferred embodiment thereof is the same as that described in the section of Negative electrode binder.

<Positive Electrode Sheet for Power Storage Device>

The positive electrode sheet for power storage device is a sheet formed by casting or applying the electrode mixture paste, which is a mixture of a positive electrode binder, a positive electrode active material, and an optional component such as a conductive agent, on a current collector to form an active material layer.

<Power Storage Device>

The power storage device which is one of the embodiments of the present invention includes the negative electrode sheet for the power storage device described above. For other configurations, known configurations required for a power storage device may be employed. The power storage device of the present invention includes a lithium battery, an electric double layer capacitor, a lithium ion capacitor and the like. As another aspect, the negative electrode sheet for a power storage device can be made into a sheet with a high capacity and is excellent in mechanical properties, so that it can be suitably used for an all-solid-state battery or the like.

EXAMPLES

Hereinafter, the present invention will be described in more detail with reference to Examples and Comparative Examples, but the present invention is not limited to these Examples.

The method used for measuring the characteristics in the following example is shown below.

<Tensile Breaking Energy>

A tensile breaking energy was calculated from the result of a tensile breaking test carried out in accordance with ASTM D882.

<10% Repeated Breaking Energy Retention Ratio>

The initial value of tensile breaking energy is taken as ($TEB_0$), and the tensile breaking energy calculated from the result of a tensile breaking test performed after repeating 10% strain 200 times is taken as ($TEB_{200-10}$). Calculation was made according to the following equation.

10% repeated breaking energy retention ratio= ($TEB_{200-10}$)/($TEB_0$)

<20% Repeated Breaking Energy Retention Ratio>

The initial value of tensile breaking energy is taken as ($TEB_0$), and the tensile breaking energy calculated from the result of a tensile breaking test performed after repeating 20% strain 200 times is taken as ($TEB_{200-20}$). Calculation was made according to the following equation.

20% repeated breaking energy retention ratio= ($TEB_{200-20}$)/($TEB_0$)

<30% Repeated Breaking Energy Retention Ratio>

The initial value of tensile breaking energy is taken as ($TEB_0$), and the tensile breaking energy calculated from the result of a tensile breaking test performed after repeating 30% strain 200 times is taken as ($TEB_{200-30}$). Calculation was made according to the following equation.

30% repeated breaking energy retention ratio= ($TEB_{200-30}$)/($TEB_0$)

The abbreviations of the compounds used in the following examples will be described.

s-BPDA: 3,3',4,4'-biphenyltetracarboxylic dianhydride,
ODPA: 4,4'-oxydiphthalic dianhydride,
PMDA: pyromellitic dianhydride,
ODA: 4,4'-Diaminodiphenyl ether,
PPD: p-phenylenediamine,
DMD: decamethylenediamine,
NMP: N-methyl-2-pyrrolidone

Example 1

400 g of NMP was added as a solvent to a glass reaction vessel having an internal volume of 500 mL equipped with a stirrer and a nitrogen gas introduction/discharge pipe, and 40.49 g (0.202 mol) of ODA and 59.51 g (0.202 mol) of s-BPDA was added and stirred at 50° C. for 10 hours to obtain a polyimide precursor for power storage device having a solid content concentration of 18.2% by mass and a solution viscosity of 5.0 Pa·s. The obtained polyimide precursor for power storage device was used as it was as a resin composition for a binder.

The obtained polyimide precursor for power storage device was applied onto a glass plate of a base material by a bar coater, and the coating film was defoamed and pre-dried at 25° C. under reduced pressure for 30 minutes, and then it was placed in a hot air dryer under a nitrogen gas atmosphere at normal pressure and heat-treated at 120° C. for 30 minutes, 150° C. for 10 minutes, 200° C. for 10 minutes, 250° C. for 10 minutes, and 350° C. for 10 minutes to form a binder resin film having a thickness of 30 μm.

The obtained film had a ($TEB_0$) of 163 MJ/m$^3$ and a ($TEB_{200-10}$) of 151 MJ/m$^3$, and had a 10% repeated breaking energy retention ratio of 93%.

Example 2

425 g of NMP was added as a solvent to a glass reaction vessel having an internal volume of 500 mL equipped with a stirrer and a nitrogen gas introduction/discharge pipe, and 13.45 g (0.078 mol) of DMD and 15.63 g (0.078 mol) of ODA and 45.92 g (0.156 mol) of s-BPDA were added and stirred at 50° C. for 10 hours to obtain a polyimide precursor for power storage device having a solid content concentration of 13.3% by mass and a solution viscosity of 3.4 Pa·s.

The obtained polyimide precursor for power storage device was applied onto a glass plate of a base material by a bar coater, and the coating film was defoamed and pre-dried at 25° C. under reduced pressure for 30 minutes, and then it was placed in a hot air dryer under a nitrogen gas atmosphere at normal pressure and heat-treated at 120° C. for 30 minutes, 150° C. for 10 minutes, 200° C. for 120 minutes to form a binder resin film having a thickness of 30 μm.

The obtained film had ($TEB_0$) of 181 MJ/m$^3$, ($TEB_{200-10}$) of 179 MJ/m$^3$, ($TEB_{200-20}$) of 159 MJ/m$^3$, and ($TEB_{200-30}$) of 132 MJ/m$^3$, and had 10% repeated breaking energy retention ratio of 99%, 20% repeated breaking energy retention ratio of 88%, and 30% repeated breaking energy retention ratio of 73%.

Example 3

400 g of NMP was added as a solvent to a glass reaction vessel having an internal volume of 500 mL equipped with a stirrer and a nitrogen gas introduction/discharge pipe, and 17.35 g (0.101 mol) of DMD and 20.17 g (0.101 mol) of ODA and 62.48 g (0.201 mol) of ODPA were added and stirred at 50° C. for 10 hours to obtain a polyimide precursor for power storage device having a solid content concentration of 18.0% by mass and a solution viscosity of 5.7 Pa·s.

The obtained polyimide precursor for power storage device was applied onto a glass plate of a base material by a bar coater, and the coating film was defoamed and pre-dried at 25° C. under reduced pressure for 30 minutes, and then it was placed in a hot air dryer under a nitrogen gas atmosphere at normal pressure and heat-treated at 120° C. for 30 minutes, 150° C. for 10 minutes, 200° C. for 120 minutes to form a binder resin film having a thickness of 30 μm.

The obtained film had ($TEB_0$) of 147 MJ/m$^3$ and ($TEB_{200-10}$) of 140 MJ/m$^3$, and had 10% repeated breaking energy retention ratio of 96%.

Example 4

400 g of NMP was added as a solvent to a glass reaction vessel having an internal volume of 500 mL equipped with a stirrer and a nitrogen gas introduction/discharge pipe, and 32.56 g (0.163 mol) of ODA and 4.40 g (0.041 mol) of PPD and 63.05 g (0.203 mol) of ODPA were added and stirred at 50° C. for 10 hours to obtain a polyimide precursor for a storage device having a solid content concentration of 18.1% by mass and a solution viscosity of 6.3 Pa·s.

The obtained polyimide precursor for power storage device was applied onto a glass plate of a base material by a bar coater, and the coating film was defoamed and pre-dried at 25° C. under reduced pressure for 30 minutes, and then it was placed in a hot air dryer under a nitrogen gas atmosphere at normal pressure and heat-treated at 120° C. for 30 minutes, 150° C. for 10 minutes, 200° C. for 120 minutes to form a binder resin film having a thickness of 30 µm.

The obtained film had $TEB_0$ of 140 $MJ/m^3$, $TEB_{200-10}$ of 139 $MJ/m^3$, and 10% repeated breaking energy retention ratio of 99%.

Comparative Example 1

400 g of NMP was added as a solvent to a glass reaction vessel having an internal volume of 500 mL equipped with a stirrer and a nitrogen gas introduction/discharge pipe, and 47.85 g (0.239 mol) of ODA and 52.15 g (0.239 mol) of PMDA were added and stirred at 50° C. for 10 hours to obtain a polyimide precursor having a solid content concentration of 18.0% by mass and a solution viscosity of 4.8 Pa·s.

The obtained polyimide precursor was applied onto a glass plate of a base material by a bar coater, and the coating film was defoamed and pre-dried at 25° C. under reduced pressure for 30 minutes, and then it was placed in a hot air dryer under a nitrogen gas atmosphere at normal pressure and heat-treated at 120° C. for 30 minutes, 150° C. for 10 minutes, 200° C. for 10 minutes, 250° C. for 10 minutes, and 350° C. for 10 minutes to form a resin film having a thickness of 30 µm.

The obtained film had ($TEB_0$) of 138 $MJ/m^3$ and ($TEB_{200-10}$) of 84 $MJ/m^3$, and had 10% repeated breaking energy retention ratio of 61%.

[Manufacture of Lithium Ion Secondary]

93% by mass of $LiNi_{0.5}Mn_{0.3}Co_{0.2}O_2$ and 3% by mass of acetylene black (conductive agent) were mixed, and added to and mixed with a solution containing 4% by mass of polyvinylidene fluoride (binder) dissolved in 1-methyl-2-pyrrolidone in advance to prepare a positive electrode mixture paste. This positive electrode mixture paste was applied to one side of an aluminum foil (current collector), dried, pressed, and punched to a predetermined size to form a positive electrode sheet, Positive electrode No. 1.

15% by mass (as a solid content) of the resin composition for binder obtained in Examples and Comparative Examples, 60% by mass of elemental silicon (Si), 20% by mass of artificial graphite (d002=0.335 nm), and 5% by mass of a fibrous carbon powder (diameter; 12 nm, fiber length; 114 nm) were used to prepare negative electrode mixture pastes. The negative electrode mixture paste was applied to one side of a copper foil (current collector) and heated, dried, pressed and punched to a predetermined size to prepare a negative electrode sheet. Then, the positive electrode sheet, the separator made of a microporous polyethylene film, and the negative electrode sheet were laminated in this order, and a non-aqueous electrolytic solution was added to prepare a 2032 type coin battery. The non-aqueous electrolyte solution has a composition containing 1M $LiPF_6$+0.05M $LiPO_2F_2$ dissolved in ethylene carbonate/methylethyl carbonate/diethyl carbonate/4-fluoro-1,3-dioxolane-2-one (volume ratio 25/30/40/5).

Using the produced coin battery, the battery was charged with a constant current of 1 C and constant voltage to a final voltage of 4.2V for 3 hours, and discharged to a final voltage of 2.75V under a constant current of 1 C in a constant temperature vessel at 25° C. This cycle was repeated 200 times, and the capacity retention ratio was calculated from the discharge capacities of the first and 200th times.

It was found that compared with the conventional polyimide (for example, the polyimide-based binder obtained from the resin composition for the binder of Comparative Example 1), the polyimide-based binders obtained from the resin composition for the binder of Examples 1 to 4 have a large capacity retention ratio. Therefore, it has been confirmed that the use of the polyimide-based binder for power storage device of the present invention can significantly improve the characteristics of a power storage device having a negative electrode using Si or SiO as an electrode active material to obtain higher capacity.

The invention claimed is:

1. A polyimide-based binder for power storage device having a repeated breaking energy retention ratio of 70% or more, wherein
the polyimide-based binder is obtained by imidizing a polyamic acid solution comprising a repeating unit represented by the following general formula (I):

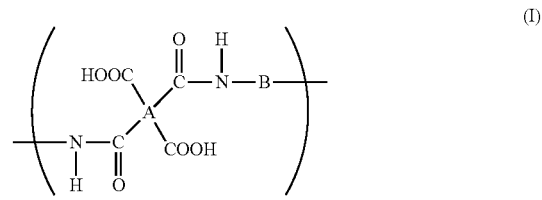

wherein, A is one or more tetravalent groups selected from groups having aromatic ring(s), open-chain aliphatic groups or groups having an alicyclic structure, which may be substituted with halogen and may be the same or two or more types; and B is one or more divalent groups selected from groups having aromatic ring(s), open-chain aliphatic groups or groups having an alicyclic structure, which may be substituted with halogen, and may be the same or two or more types; and
wherein in the general formula (I), 50 mol % or more of one of the groups A and B is an open-chain aliphatic group.

2. The polyimide-based binder for power storage device according to claim 1, wherein the binder does not melt at a temperature of 300° C. or less.

3. The polyimide-based binder for power storage device according to claim 1, wherein in the general formula (I), 50 mol % or more of A is a group represented by the following general formula (II):

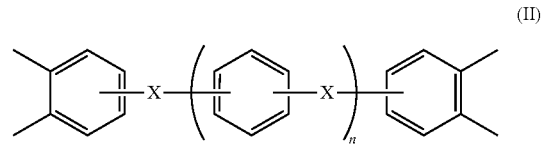

wherein, X is a single bond or an oxygen atom, n is an integer from 0 to 2, and if n is 1 or 2, X may be the same or different.

4. A resin composition for a binder, comprising a polyamic acid having a repeating unit represented by the following general formula (I) and a solvent, and capable of forming the polyimide-based binder for power storage device according to claim 1 by an imidization reaction:

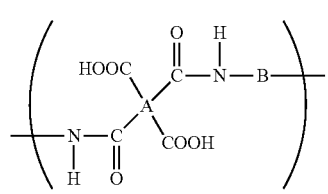 (I)

wherein A is one or more tetravalent groups selected from groups having aromatic ring(s), open-chain aliphatic groups or groups having an alicyclic structure, which may be substituted with halogen and may be the same or two or more types; and B is one or more divalent groups selected from groups having aromatic ring(s), open-chain aliphatic groups or groups having an alicyclic structure, which may be substituted with halogen, and may be the same or two or more types.

5. An electrode mixture paste containing the resin composition for binder according to claim 4 and an electrode active material.

6. A negative electrode active material layer comprising the binder for power storage device according to claim 1 and an electrode active material.

7. A negative electrode sheet for power storage device, comprising the negative electrode active material layer according to claim 6 formed on a surface of a current collector.

8. A power storage device comprising the negative electrode sheet for the power storage device according to claim 7.

\* \* \* \* \*

UNITED STATES PATENT AND TRADEMARK OFFICE
CERTIFICATE OF CORRECTION

| | | |
|---|---|---|
| PATENT NO. | : 12,176,543 B2 | |
| APPLICATION NO. | : 17/593595 | |
| DATED | : December 24, 2024 | |
| INVENTOR(S) | : Takeshige Nakayama and Kazutaka Narita | |

It is certified that error appears in the above-identified patent and that said Letters Patent is hereby corrected as shown below:

On the Title Page

Column 1, Line 2, under (72) Inventors:, delete "Yamagata" and insert --Ube--.

In the Specification

In Column 2, Line 67, delete "formula (I);" and insert --formula (I):--.

In Column 5, Line 2, delete "for evaluation" and insert --for evaluation.--.

In Column 5, Line 11, delete "storage device" and insert --storage device.--.

In Column 6, Line 5 (Approx.), delete "and $Y_i$" and insert --and $Y_1$--.

In Column 6, Line 15 (Approx.), delete "or a $Y_i$" and insert --or a $Y_1$--.

In Column 6, Line 36, delete "(hexafluoroisopropyridene) diphthalate" and insert --(hexafluoroisopropylidene) diphthalate--.

In Column 7, Line 45, delete "polysiloxane structure." and insert --polysiloxane structure,--.

In Column 10, Line 61, delete "carbon fibers" and insert --carbon fibers.--.

In Column 13, Line 29, delete "of 0" and insert --of O--.

In Column 14, Line 32 (Approx.), delete "by mass" (second occurrence) and insert --by mass.--.

In Column 15, Line 47 (Approx.), delete "2-pyrrolidone" and insert --2-pyrrolidone.--.

Signed and Sealed this
Twenty-ninth Day of April, 2025

Coke Morgan Stewart
*Acting Director of the United States Patent and Trademark Office*